United States Patent

Rastoin

[15] 3,707,224
[45] Dec. 26, 1972

[54] CONVEYOR DEVICE FOR PULVERIZED, GRANULAR, FIBROUS OR FLUID PRODUCTS

[72] Inventor: Blaise B. Rastoin, 42, Avenue de la Panouse, Le Cabot, Marseille, France

[22] Filed: Oct. 27, 1970

[21] Appl. No.: 84,305

[30] Foreign Application Priority Data

Nov. 5, 1969 France....................................6938598
March 16, 1970 France....................................7009351
Nov. 5, 1969 France....................................6938599

[52] U.S. Cl.......................................198/213, 198/64
[51] Int. Cl.................................................B65g 33/00
[58] Field of Search.........198/64, 213; 222/412, 413

[56] References Cited

UNITED STATES PATENTS

| 3,381,801 | 5/1968 | Rastoin | 198/213 |
| 1,053,645 | 2/1913 | Reimer | 198/213 X |
| 3,560,133 | 2/1971 | Ryczek | 198/213 X |
| 2,755,002 | 6/1956 | Gustafson | 222/412 X |
| 3,141,545 | 7/1964 | Holland | 198/213 |

FOREIGN PATENTS OR APPLICATIONS

| 466,132 | 1/1969 | Switzerland | 198/213 |
| 627,869 | 7/1957 | Canada | 222/413 |

*Primary Examiner*—Richard E. Aegerter
*Assistant Examiner*—Douglas D. Watts
*Attorney*—Edwin E. Greigg

[57] ABSTRACT

This invention relates to a conveying device for conveying pulverized, granular, fibrous or fluid materials, composed of a fixed cylindrical tube, a helical conveying element and a cylindrical central core. The conveying spiral occupies substantially all the space between the tube and the central core. To each speed of the spiral there corresponds a well determined output. The output is controlled by adjusting the speed of rotation of the spiral.

1 Claim, 6 Drawing Figures

PATENTED DEC 26 1972

Inventor
Blaise B. Rastoin

By Edwin E. Greigg
Attorney

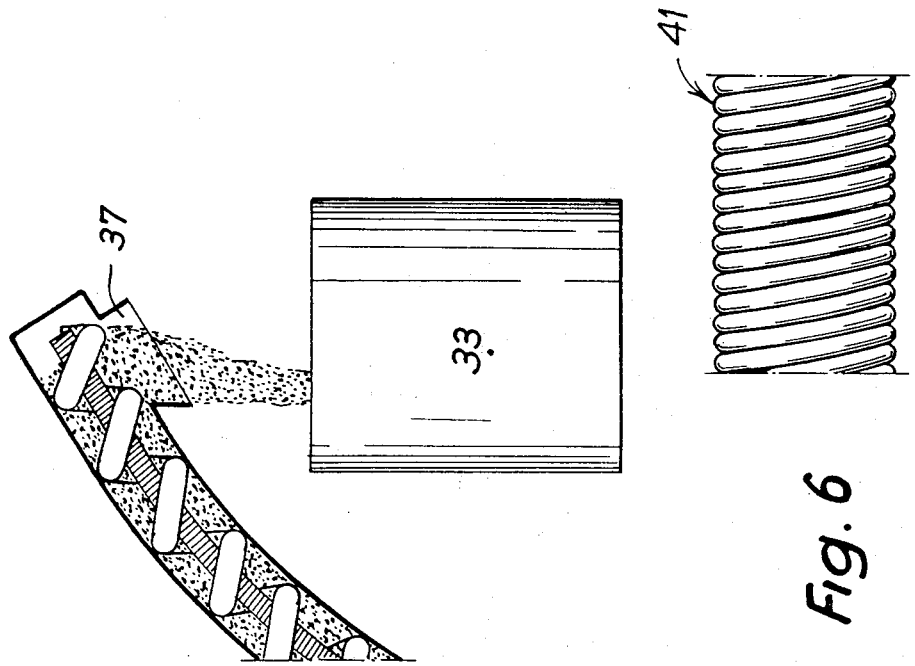
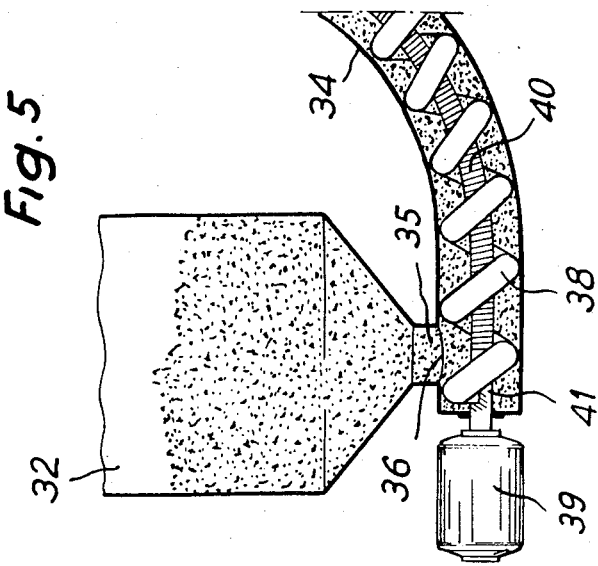
Fig. 5
Fig. 6

CONVEYOR DEVICE FOR PULVERIZED, GRANULAR, FIBROUS OR FLUID PRODUCTS

This invention relates to improvements in spiral conveyors of known type, and especially to improvements in spiral conveyors according to my U. S. Pat. No. 3,381,801, and my copending application Ser. No. 105,536.

The present invention relates to a conveying device for conveying pulverized, granular, fibrous or fluid materials composed of a fixed cylindrical tube having at least one opening near each of its ends; a conveying spiral constituted by a helically wound wire, rotated, inside said tube, by one of its ends, and of a cylindrical core disposed longitudinally at the center of said spiral, said conveying device being characterized in that the difference between the inner radius of the tube and the outer radius of the central core is slightly larger than the diameter of the wire which constitutes the conveying spiral.

One of the aims of the invention is a conveyer whose output is regular and is determined with high precision, of the order of 1 percent, for each speed of rotation of the spiral. Thus the output of this conveyer may be controlled by acting solely on the speed of drive, this enabling a plurality of conveyers to be used, each of them delivering a different product into the same container in order to obtain a mixture of the constituents in pre-determined proportions. The conveyers according to the invention then fulfill the function of dozer conveyers with controlled volumetric output.

According to a characteristic of the invention, an output, which is predetermined as a function of the speed, is obtained if the conveying spiral occupies, with a small clearance, the annular space between the fixed outer tube and the central core and if the speed of rotation of the conveying spiral relative to the central core is well determined for each speed of the spiral.

The central core may be fixed to the casing. In this case, its speed of rotation is always zero and the preceding condition is fulfilled.

The central core may be rotated by one of its ends at the same time as the spiral. In this case, the relative speed of the spiral with respect to said core is always zero.

As the conveyer is flexible, a tube is then preferably used as central core, which is formed by a helical spring with contiguous spirals in order to avoid fatigue of the material.

The central core may also be free to rotate on itself. In fact, in this case, experience shows that the central core is rotated by the effect of the friction of the conveying spiral and the products, at a speed substantially equal to that of the spiral. The relative speed of rotation of the spiral with respect to the central core is thus practically zero and the output of the conveyer is determined with a sufficient precision for each speed of rotation of the conveying spiral.

According to a characteristic of the invention, a floating central core, entirely free at its two ends, is used, this being made possible by the small clearance between this core and the conveying spiral.

In order to facilitate the centering and rotation of this floating core, it carries at its downstream end, a conical male ferrule which cooperates, in operation, with a conical female ferrule.

The invention will be more readily understood with reference to the accompanying drawings in which:

FIG. 1 schematically shows a transverse section of a conveyer according to the invention.

Figure 4:
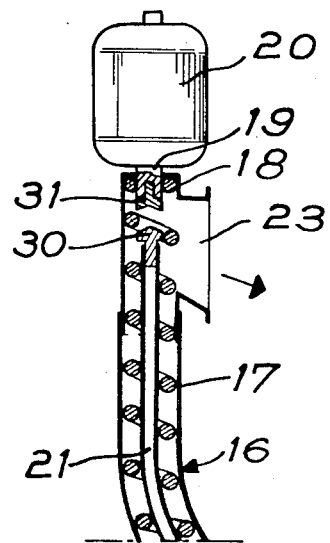
Figure 4:
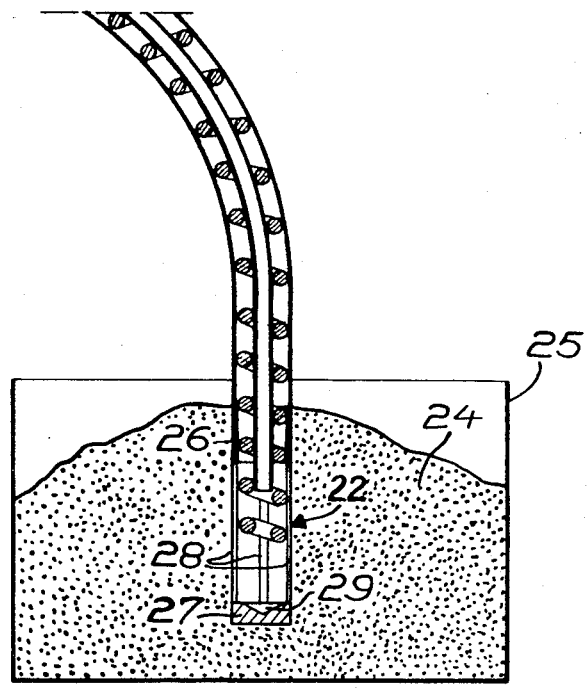

FIG. 4 schematically shows a transverse section through another embodiment, with floating central core.

FIG. 5 shows a transverse section of an embodiment with central core constituted by contiguous helical elements.

FIG. 6 is a view on a larger scale of a section of the central core of FIG. 5.

Figure 1:
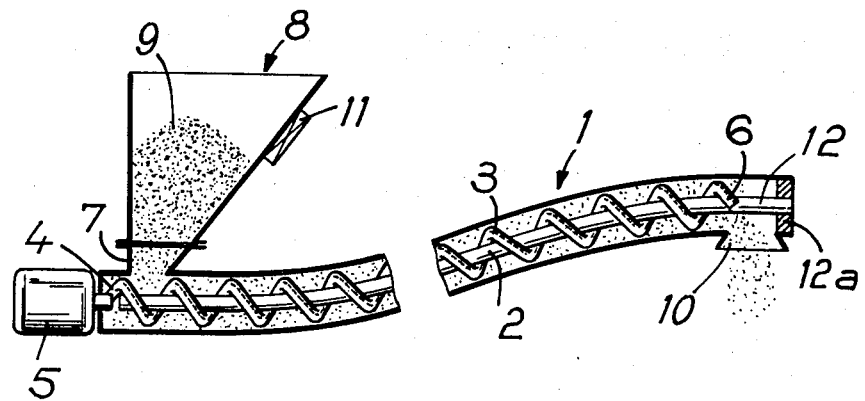
Figure 2:
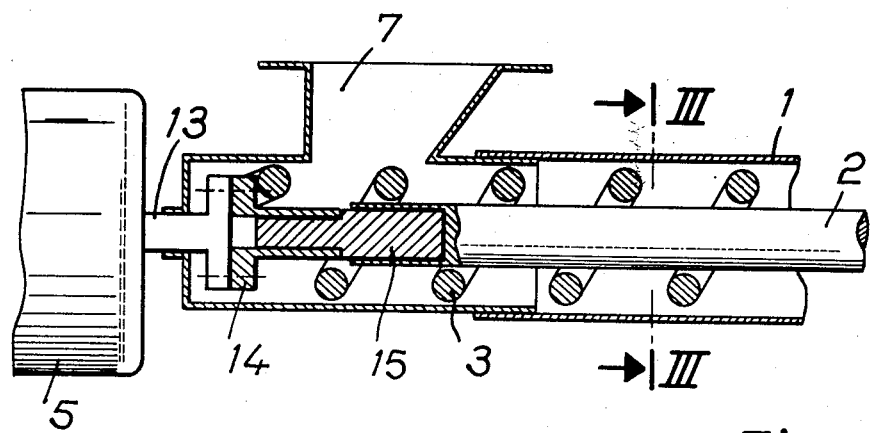
FIG. 2 is a transverse section, on a larger scale, of the inlet opening for the products, in another embodiment of the invention.
Figure 3:
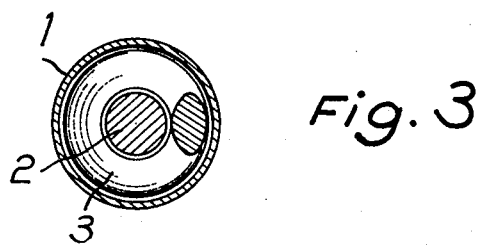
FIG. 3 is a transverse section along III—III of FIG. 2.

Referring now to the drawings, FIGS. 1, 2 and 3 show a fixed cylindrical tube 1, a cylindrical core 2 and a helically wound wire 3 in the form of a helical spring which is rotated by the end 4 by means of a speed variator 5 of known type, for example an electric motor with adjustable speed. The helical element 3 constitutes a conveying spiral. The other end 6 of this spiral is free.

The tube 1 and the core 2 are flexible but may also be rigid if the path is rectilinear. The central core may be constituted by a hollow tube or by a solid rod. The tube 1 comprises an inlet aperture 7 for the products, which is connected to the outlet spout of a hopper 8 containing products 9 to be transported, for example, pulverized, granular or fibrous products. A vibrator 11, placed on the wall of the hopper, possibly facilitates the flow of the products.

The tube 1 comprises an outlet aperture 10 for the products, which is placed above a container (not shown) into which the products flow by gravity. The central core 2 is centered, by its upstream end 12, in a support 12a fixed to the tube. It may be fixed in the support 12a in which case the other end of the core 2 is free as shown in FIG. 1.

The support 12a may also be constituted by a bearing in which the core 2 may freely rotate. In this case, the other end of the core 2 may be free as shown in FIG. 1 or rotated, at the same time as the spiral 3 as shown in FIG. 2.

In all cases, a conveyer according to the invention differs from the conveyers of known type by the fact that the conveying spiral 3 occupies with all clearance all the annular space defined by the outer tube 1 and by the central core 2.

In other words, the diameter of the wire which constitutes the spiral 3 is slightly smaller than the difference between the inner radius of the tube 1 and the outer radius of the central core 2.

The products which are introduced through opening 7 into the annular space are conveyed forwardly by the effect of the spiral 3, this effect being comparable to an extrusion of the products. This results in a very regular output, without variations, during the whole cycle of rotation of the spiral. On the other hand, to each speed of rotation of the spiral relative to the walls which enframe it, there corresponds a well determined output. This output may be varied by leaving the speed fixed and by varying the dimensions of the inlet opening for the products by means of a diaphragm or movable register (not shown).

The sought after aim is to obtain a determined output for each value of the absolute speed of rotation of the spiral in order to be able to control the output by varying the absolute speed of the drive unit 5. As the outer tube is fixed, this aim may be achieved by using a plurality of embodiments concerning the central core.

A first solution, shown in FIG. 1, consists in fixing the downstream end of the core 12 in a support 12a unitary with the casing. The other end of the rod 2 is then free. The support 12a may also be replaced by a bearing in which the core 2 may rotate freely. The other end of the core 2 may then be rotated at the same time as the spiral 3 in which case the relative speed of the spiral 3 and the core 2 is always zero. In this case, as a variant, the other end of the core 2 may be free and experience has shown that in practice, this case is similar to the preceding one as, due to the frictions, the core is then rotated substantially at the same speed as the spiral.

FIG. 2 shows an embodiment in which the core 2 is driven in rotation at the same time as the spiral by its upstream end. In this case, the downstream end may either be free or be centered in a bearing in which it may rotate freely. This Figure shows the outer tube 1 and the inlet opening 7 for the products. The upstream end of the spiral 3 is fixed to the periphery of a hollow collar 14, which is coupled to the shaft end 13 rotated by the variable speed unit 5.

The end of the central core 2 is hollow and fitted to a male connection 15 whose other end is fitted in the collar 14.

Although it is driven, in this embodiment, at the same time as the spiral 3, the central core does not constitute a drive shaft for the spiral. It is independent of the spiral over the whole length thereof except at the upstream end. It has for its function to guide the spiral and to canalize the products, like the outer tube.

FIG. 3 shows the transverse section of the conveyer of FIG. 2 which shows that the helical element 3 occupies substantially the whole annular space between the outer tube 1 and the central core 2.

FIG. 4 shows another embodiment of a conveyer composed of a fixed outer tube 16; a helical element 17 driven in rotation by its end 18 which is fixed to the periphery of the shaft end 19 driven by a variable speed motor 20 and a central core 21. The spiral 17 still occupies, with a small clearance, the annular space defined by the tube 16 and the core 21. The tube 16 comprises an inlet opening 22 for the products 22, and an opening 23 for the outlet thereof. The products to be transported are powdery, granular, fibrous or fluid products 24 contained in an upwardly open container 25.

The opening 22 is plunged into the products in the manner of a pump strainer in a liquid. It is formed of two rigid sleeves 26 and 27 connected by open-work crosspieces 28. A hollow impression 29 is made in the base 27 to serve as a stop for the spiral 17 when it extends during operation.

This embodiment differs from the preceding ones in that the central core 21 is floating, its two ends being free. During the operation of the conveyer, the frictions drive the core 21 downstream direction.

The end of the core 21 is provided with a conical male ferrule 30 which then fits in a conical female ferrule 31 carried by the shaft end 19.

During operation, the central core 21 centers itself automatically due to the small clearance which it has with respect to the conveyer spring and it is rotated at the same speed as the spiral, under the effect of the frictions.

This embodiment has the advantage of a simpler production and of an open-work strainer passing substantially as far as the end of the conveyer, this enabling the container to be almost completely emptied, whilst in the embodiments where the central core is held at its upstream end by a support or a bearing, this latter occupies a more considerable height.

FIG. 5 shows a conveyer for conveying powdery, granular or fibrous products contained in a hopper 32 as far as a container 33.

This conveyer is composed of a flexible and fixed outer tube 34, having an inlet opening 35 for the products, connected to the outlet spout 36 of the hopper 32 and an outlet aperture 37 for the products placed above the container 33. Inside the tube 34, a helical conveying member 38 formed of a helically wound wire, is rotated by a variable speed motor 39. A flexible core 40 is placed at the center of the spiral 38. The core 40 is rotated, by one of its ends, by means of the shaft end 41, at whose periphery is fixed the end of the spiral 38. The downstream ends of the spiral 38 and of the core 40 are free. The spiral 38 substantially occupies, with a small clearance, all the annular space between the tube 34 and the core 38.

The conveyer with controlled output, shown in FIG. 5, is also flexible and may also follow a winding path in the curved parts, however the inner core 38, driven in rotation, is subjected alternately to compressive and tensive stresses which cause a fatigue of the material.

According to a characteristic of the invention, in order to reduce this fatigue, the central core is constituted of contiguous helical loops. FIG. 6 shows, on a larger scale, a section of this core formed of a helically wound wire 41 whose pitch is equal to the diameter of the wire.

What is claimed is:

1. In a conveying device, for pulverulent, granular, fibrous and fluid substances, the combination comprising a first flexible tube having a given inner radius open at its ends, means defining an inlet opening in said tube adjacent one end thereof, a flexible floating unattached core having a given outer radius disposed axially within the flexible tube and spaced from the internal wall of the tube so as to define therewith a longitudinal flow path of annular cross section, a spiral member disposed coaxially in the annular spacing between the core and the tube, and drive means for rotating said spiral member with respect to the tube and the flexible core to feed said substance toward means defining an outlet in said tube, the difference between the inner radius of said tube and the outer radius of said flexible core being slightly larger than the diameter of the wire which constitutes said spiral member, said drive means for rotating said spiral member being a variable speed means, and said conveying device constituting a volumetric device capable of transporting substances through an upwardly extending curvilinear path from said inlet opening to said outlet opening at a controlled rate.

* * * * *